United States Patent
Jung et al.

(10) Patent No.: US 9,825,324 B2
(45) Date of Patent: Nov. 21, 2017

(54) ELECTRODE ASSEMBLY AND BATTERY CELL INCLUDING THE SAME

(71) Applicant: LG CHEM, LTD., Seoul (KR)

(72) Inventors: Seung Hun Jung, Daejeon (KR); Dal Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 184 days.

(21) Appl. No.: 14/758,725

(22) PCT Filed: Dec. 15, 2014

(86) PCT No.: PCT/KR2014/012341
§ 371 (c)(1),
(2) Date: Jun. 30, 2015

(87) PCT Pub. No.: WO2015/115731
PCT Pub. Date: Aug. 6, 2015

(65) Prior Publication Data
US 2015/0372335 A1    Dec. 24, 2015

(30) Foreign Application Priority Data

Jan. 28, 2014  (KR) .................. 10-2014-0010119
Nov. 24, 2014  (KR) .................. 10-2014-0164680

(51) Int. Cl.
*H01M 10/02*     (2006.01)
*H01M 2/30*      (2006.01)
(Continued)

(52) U.S. Cl.
CPC ............. *H01M 10/02* (2013.01); *H01M 2/26* (2013.01); *H01M 2/266* (2013.01); *H01M 2/30* (2013.01);
(Continued)

(58) Field of Classification Search
CPC .. H01M 10/02; H01M 10/04; H01M 10/0463; H01M 10/0585; H01M 2/26; H01M 2/266; H01M 2/30
See application file for complete search history.

(56) References Cited

U.S. PATENT DOCUMENTS 6,432,578 B1     8/2002  Sugita et al.
2008/0070102 A1*  3/2008  Watanabe ............... H01M 2/26
                                                        429/91
(Continued)

FOREIGN PATENT DOCUMENTS

JP     10-208753 A      8/1998
JP     2009-123583 A    8/1998
(Continued)

OTHER PUBLICATIONS

Extended European Search Report dated Feb. 25, 2016, for European Application No. 14875887.3 is provided.

*Primary Examiner* — Carlos Barcena
(74) *Attorney, Agent, or Firm* — Birch, Stewart, Kolasch & Birch, LLP

(57) ABSTRACT

An electrode assembly includes a unit cell A in which a first electrode 110, a second electrode 120, and a separator 130 disposed between the first and second electrodes 110 and 120 are stacked on each other or a structure in which the unit cells A are repeatedly stacked with the separator therebetween. A first electrode tab 111 protrudes from the first electrode 110, and a second electrode tab 121 protrudes from the second electrode 120, and the electrodes tabs 111 and 121 have widths that gradually decrease in directions in which the electrodes tabs 111 and 121 protrude outward from the electrodes 110 and 120, respectively.

16 Claims, 8 Drawing Sheets

(51) Int. Cl.
*H01M 2/26* (2006.01)
*H01M 10/04* (2006.01)
*H01M 10/0585* (2010.01)

(52) U.S. Cl.
CPC ....... *H01M 10/04* (2013.01); *H01M 10/0463* (2013.01); *H01M 10/0585* (2013.01)

(56) References Cited

U.S. PATENT DOCUMENTS

| | | | |
|---|---|---|---|
| 2010/0081052 A1* | 4/2010 | Morishima | H01M 2/263 429/211 |
| 2011/0244287 A1* | 10/2011 | Kim | H01M 2/021 429/94 |
| 2012/0064382 A1 | 3/2012 | Ahn | |
| 2012/0135285 A1* | 5/2012 | Iwama | H01M 2/26 429/94 |
| 2012/0177981 A1 | 7/2012 | Kim | |
| 2012/0308855 A1* | 12/2012 | Shimizu | H01M 2/0426 429/53 |
| 2013/0266845 A1 | 10/2013 | Kanda et al. | |
| 2014/0349181 A1 | 11/2014 | Lim et al. | |
| 2015/0017517 A1 | 1/2015 | Minagata | |

FOREIGN PATENT DOCUMENTS

| | | |
|---|---|---|
| JP | 3111280 U | 7/2005 |
| JP | 2011-86505 A | 4/2011 |
| JP | 2013-175407 A | 9/2013 |
| WO | WO 2013/157827 A1 | 10/2013 |

* cited by examiner

ELECTRODE ASSEMBLY AND BATTERY CELL INCLUDING THE SAME

TECHNICAL FIELD

The present invention relates to an electrode assembly and a battery cell including the same, and more particularly, to an electrode assembly having an improved structure in which an electrode tab protrudes from an electrode without forming corner portions thereof and a battery cell including the same.

BACKGROUND ART

In general, batteries are configured to obtain electric energy by using chemical or physical reaction. Here, chemical batteries are classified into primary and secondary batteries. That is, single-use batteries such as manganese batteries, alkaline batteries, and mercury batteries are called primary batteries, and rechargeable batteries such as rechargeable batteries or lead storage batteries are called secondary batteries.

Secondary batteries may be variously classified according to the structure of an electrode assembly. For example, secondary batteries may be classified into a stacking-type, a winding-type (a jelly-roll-type), or a stacking/folding type according to the structure of the electrode assembly. In the stacking type structure, each of a negative electrode, a separator, and an positive electrode is cut to a predetermined size, and then, the cut negative electrode, separator, and positive electrode are successively stacked to form an electrode assembly. Here, the separator is disposed between the negative electrode and the positive electrode. In the winding-type structure, each of a negative electrode, a separator, an positive electrode, and a separator is formed in a sheet shape, and then, the negative electrode, the separator, the positive electrode, and the separator are successively stacked and wound to form an electrode assembly. In the stacking/folding type structure, a full cell or bicell is formed and then wound through a separator sheet to form an electrode assembly. Here, each of a negative electrode, a separator, and an positive electrode is cut to a predetermined size, and then, the cut negative electrode, separator, and positive electrode are successively stacked to form the full cell or bicell (the full cell or the bicell includes at least one negative electrode, separator, and positive electrode).

DISCLOSURE OF THE INVENTION

Technical Problem

As illustrated in FIG. 1, the secondary battery according to the related art includes a unit cell A in which a first electrode 10, a second electrode 20, and a separator 30 disposed between the first and second electrodes 10 and 20 are stacked on each other or an electrode assembly having a structure in which the unit cells A are repeatedly stacked with the separator 30 therebetween. A first electrode tab 11 protrudes from the first electrode 10, and a second electrode tab 21 protrudes from the second electrode 20. Also, a first electrode lead is welded on the first electrode tab 11, and a second electrode lead is welded on the second electrode tab 21.

However, in the secondary battery according to the related art, when an external impact is applied to the secondary battery, stress is concentrated to corner portions 1a and 2a where the electrode tabs 11 and 12 are connected to the electrodes 10 and 20 to cause cracks in the corner portions 1a and 2a.

An aspect of the present invention is to provide an electrode assembly having an improved structure in which an electrode tab protrudes from the electrode without forming corner portions thereof and a battery cell including the same.

Technical Solution

According to an aspect of the present invention, there is provided an electrode assembly having a unit cell A in which a first electrode 110 a second electrode 120, and a separator 130 disposed between the first and second electrodes 110, 120 are stacked on each other or a structure in which the unit cells A are repeatedly stacked with the separator therebetween, wherein a first electrode tab 111 protrudes from the first electrode 110, and a second electrode tab 121 protrudes from the second electrode 120, and the electrodes tabs 111 and 121 have widths that gradually decrease in directions in which the electrodes tabs 111 and 121 protrude outward from the electrodes 110 and 120, respectively.

The first and second electrode tabs 111 and 121 may respectively protrude from both sides of the electrode assembly, and the first and second electrode tabs 111 and 121 may respectively protrude from both vertexes 1b and 2b of the electrodes 110 and 120.

Each of the first and second electrode tabs 111 and 121 may have a trapezoidal shape.

The trapezoidal first and second electrode tabs 111 and 121 may have linear side surfaces 111a and 121a.

The first and second electrodes may have curved side surfaces 111b and 121b that are gradually recessed from both ends toward the centers thereof.

The first and second electrodes 111 and 121 may have side surfaces of which respective central portions convexly protrude to form protruding portions 111c and 121c that gradually protrude from both ends toward the centers thereof.

The electrode assembly may further include first and second electrode leads 140 and 150 respectively coupled to the first and second electrode tabs 111 and 121.

Coupling parts 141 and 151 of the first and second electrode leads 140 and 150 respectively coupled to the first and second electrode tabs 111 and 121 may correspond to the first and second electrode tabs 111 and 121.

The first and second electrode tabs 111 and 121 and the coupling parts 141 and 151, which correspond to each other may have linear side surfaces.

The first and second electrode tabs 111 and 121 and the coupling parts 141 and 151, which correspond to each other may have curved side surfaces that are gradually recessed from both ends toward the centers thereof.

The first and second electrode tabs 111 and 121 and the coupling parts 141 and 151, which correspond to each other may have protruding side surfaces that gradually protrude from both ends toward the centers thereof.

According to another aspect of the present invention, there is provided a battery cell including: an electrode assembly 100 manufactured by any one of claims 1 to 11; and a pouch 200 for accommodating the electrode assembly 100.

Advantageous Effects

The present invention has following effects.

First: The electrode tab may have the trapezoidal shape having the width gradually decreases in the direction in which the electrode tab protrudes outward from both vertexes of the electrode to prevent the corner portion having bad durability from being formed.

Second: The trapezoidal electrode tab may have the side surface having one of the linear portion, curved portion, and protruding portion to improve durability of the electrode tab.

Third: The coupling part of the electrode lead attached to the electrode tab may have the shape corresponding to that of the electrode tab increase integrity and the coupling forces.

MODE FOR CARRYING OUT THE INVENTION

Figure 1:
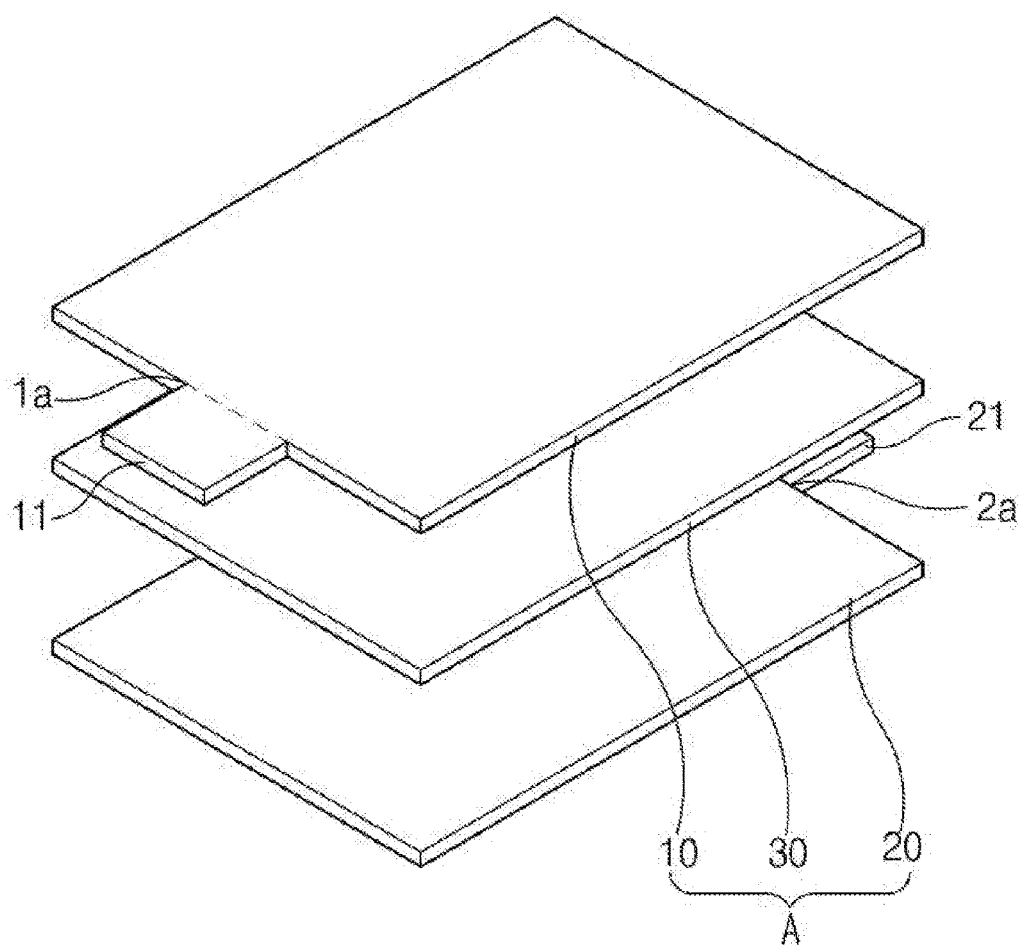
FIG. 1 is a perspective view of an electrode assembly according to a related art.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present disclosure will be omitted for clarity, and also like reference numerals in the drawings denote like elements.

[Electrode Assembly According to the Present Invention]

Figure 2:
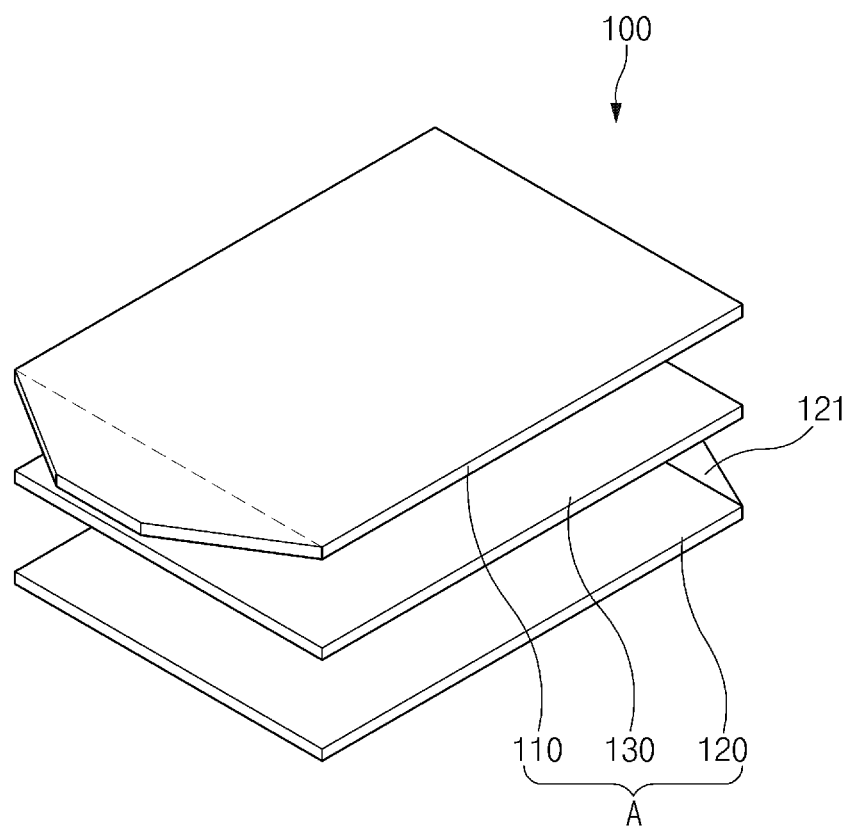
FIG. 2 is a perspective view of an electrode assembly according to the present invention.
Figure 3:
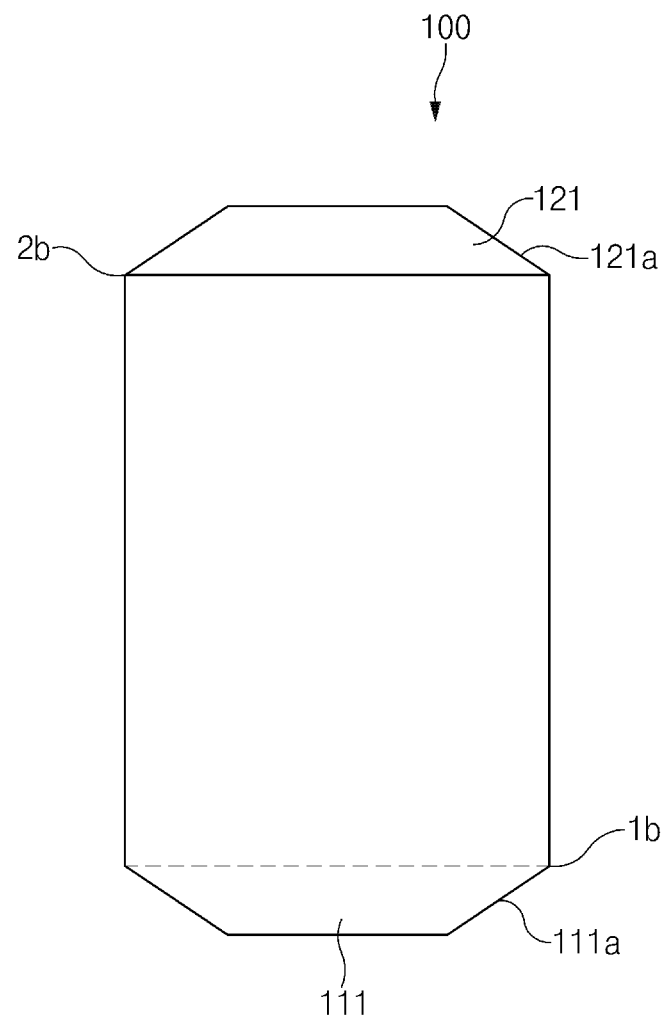
FIG. 3 is a plan view of the electrode assembly according to the present invention.

As illustrated in FIGS. 2 and 3, an electrode assembly 100 according to the present invention includes a unit cell A in which a first electrode 110, a second electrode 120, and a separator 130 disposed between the first and second electrodes 110 and 120 are stacked on each other or a structure in which the unit cells A are repeatedly stacked with the separator therebetween.

More particularly, as illustrated in FIG. 2, the electrode assembly 100 according to the present invention may be formed by successively stacking the first electrode 110, the separator 130, and the second electrode 120 in order from an upper side. Here, the first electrode 110 and the second electrode 120 may be electrodes opposite to each other. For example, when the first electrode 110 is a negative electrode, the second electrode 120 may be an positive electrode, and vice versa.

The electrode may be manufactured through the following processes. First, a current-collecting foil from which a tab protrudes is prepared, and an electrode active material is applied onto one or both surfaces of the prepared current-collecting foil to manufacture an electrode. Here, when a first electrode active material is applied onto the current-collecting foil, the first electrode 110 from which the first electrode tab 111 protrudes is manufactured. Also, when a second electrode active material is applied, the second electrode 120 from which the second electrode tab 121 protrudes is manufactured.

Here, since the electrode tabs 111 and 121 protruding from the electrodes 110 and 120 extend and protrude from the thin current-collecting foil, the electrode tabs 111 and 121 may be bad in durability. In particular, corner portions where the electrode tabs 111 and 121 are connected to the electrodes 110 and 120 may be cracked when vibration is generated due to the external impact.

Thus, the electrode assembly 100 according to the present invention may have the electrode tabs 111 and 121 protruding outward from the electrodes 110 and 120. Here, the electrode tabs 111 and 121 may have widths that gradually decrease in directions in which the electrode tabs 111 and 112 protrude outward from the electrodes 110 and 120, respectively. That is, each of the electrode tabs 111 and 121 may have a trapezoidal shape. Thus, the trapezoidal electrode tabs 111 and 121 may remove the corner portions through which the electrode tabs 111 and 121 are connected to the electrodes 110 and 120 to improve durability and prevent cracks from occurring.

For example, as illustrated in FIGS. 2 and 3, the electrodes 111 and 121 may protrude from the electrode assembly 100 in both side directions. Particularly, the electrodes 111 and 121 may symmetrically protrude outward from both vertexes 1b and 2b of the electrodes 110 and 120.

That is, the first electrode tab 111 may protrude outward from both vertexes 1b of one side of the first electrode 110. The second electrode 121 may protrude outward from both vertexes 2b of the other side of the second electrode 110.

Thus, the electrode tabs 111 and 121 according to the present invention may protrude from both vertexes of the electrodes of the electrode assembly 100 to increase in area and durability. Particularly, since each of the electrode tabs 111 and 121 has a trapezoidal shape, the corner portions through which the electrode tabs 111 and 121 are connected to the electrodes 110 and 120 may be completely removed to improve durability of the electrode tabs 111 and 121.

Here, a side surface of each of the electrode tabs 111 and 121 according to the present invention may have a shape for improving durability.

According an embodiment, the trapezoidal first and second electrode tabs 111 and 121 may have side surfaces with linear portions 111a and 121a. That is, as illustrated in FIG. 3, the first and second electrode tabs 111 and 121 may have linear portions 111a and 121a that are straight lines from one end to the other end thereof. Thus, the stress may be uniformly distributed to the linear portions 111a and 121a to improve the durability of the electrode tabs 111 and 121.

Figure 4:
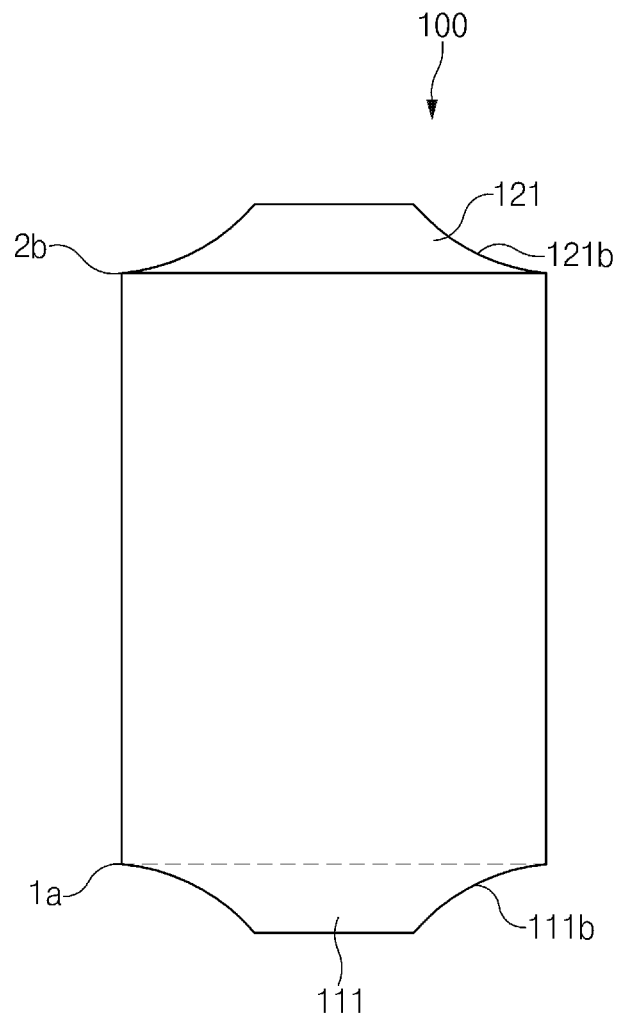
FIG. 4 is a plan view of an electrode assembly according to another embodiment of the present invention.

According to another embodiment, the trapezoidal first and second electrode tabs 111 and 121 may have side surfaces with curved portions 111b and 121b. That is, as illustrated in FIG. 4, the electrode tabs 111 and 121 may have curved portions 111b and 121b that are gradually recessed from both ends toward the centers thereof. Thus, the stress may be distributed while being guided along the curved portions 111b and 121b to improve durability of the electrode tabs 111 and 121. Particularly, since the entire side surfaces of the first and second electrode tabs 111 and 121 are curved, it may previously prevent a portion having bad durability from being formed.

Figure 5:
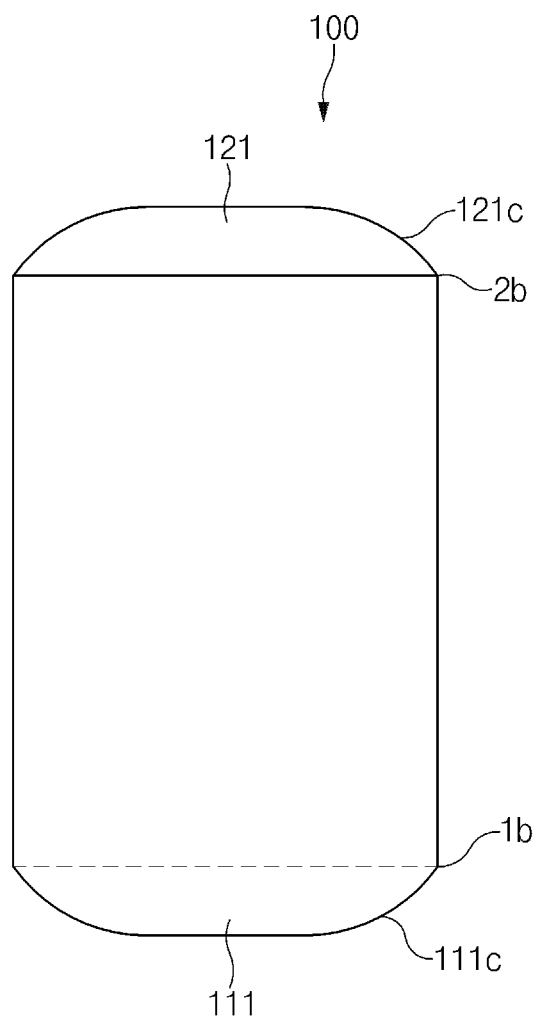
FIG. 5 is a plan view of an electrode assembly according to further another embodiment of the present invention.

According to further another embodiment, the trapezoidal first and second electrode tabs 111 and 121 may have side surfaces 111c and 121c of which respective central portions convexly protrude to form protruding portions 111c and 121c. That is, as illustrated in FIG. 5, the first and second electrode tabs 111 and 121 may have protruding portions 111c and 121c that gradually protrude from both ends toward centers of the side surfaces thereof. Thus, the stress may be uniformly distributed to the protruding portions 111c and 121c, and also the first and second electrode tabs 111 and 121 may increase in area to improve durability.

Thus, in the electrode assembly 100 according to the present invention, the first and second electrode tabs 111 and 121 may protrude in both directions. Particularly, the first and second electrode tabs 111 and 121 may protrude outward from both vertexes 1b and 2b of the electrodes 110 and 120 in the trapezoidal shapes to improve durability.

Figure 6:
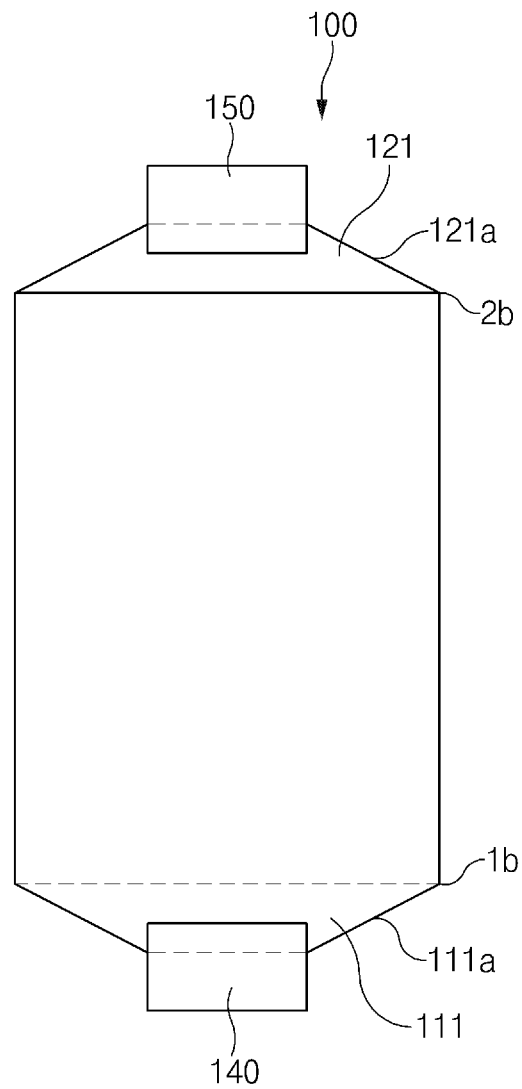
FIG. 6 is a plan view of the electrode assembly having an electrode lead according to the present invention.

As illustrated in FIG. 6, the electrode assembly 100 according to the present invention may include first and second electrode leads 140 and 150 that are respectively coupled to the first and second electrode tabs 111 and 121.

Figure 7:
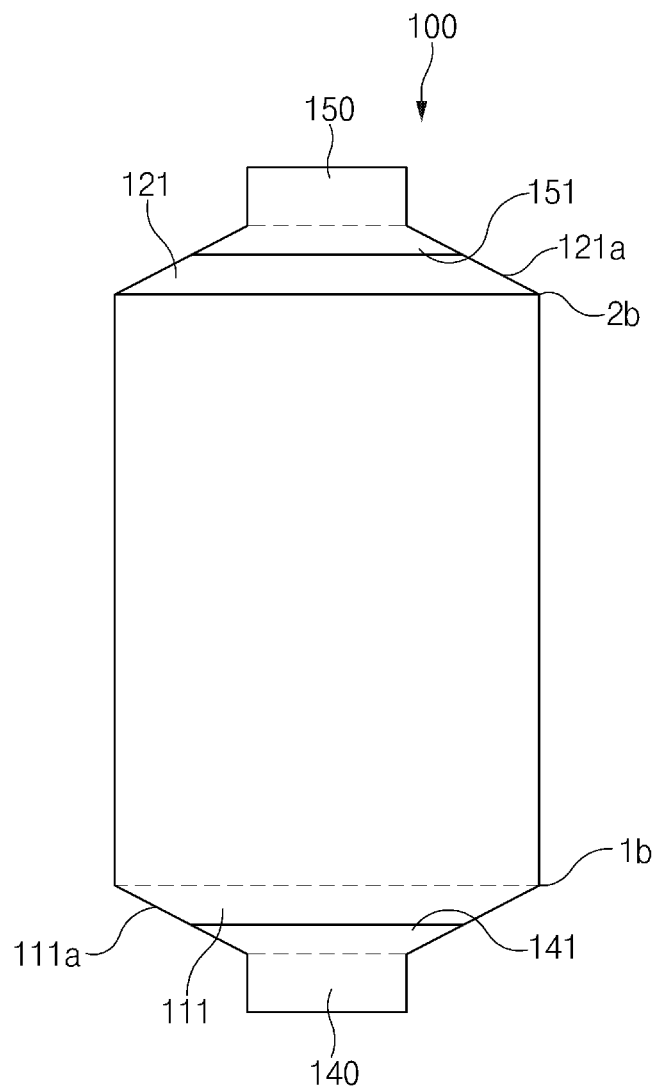
FIG. 7 is a plan view of an electrode lead according to another embodiment of the present invention.

That is, as illustrated in FIG. 7, coupling parts 141 and 151 respectively coupled to the first and second electrode tabs 111 and 121 may be disposed on the first and second electrode leads 140 and 150. The coupling parts 141 and 151 may have trapezoidal shapes to correspond to those of the first and second electrode tabs 111 and 121, respectively. Thus, coupling forces between the electrode tabs and the electrode leads may increase, and also the electrode tabs and the electrode leads may increase in durability.

Here, the coupling parts 141 and 151 of the first and second electrode leads 140 and 150 may have side surfaces having the same shapes as those of the electrode tabs.

According to an embodiment, the first and second electrode tabs 111 and 121 and the coupling parts 141 and 151, which correspond to each other may have trapezoidal shapes having linear side surfaces to uniformly distribute the stress to the linear side surfaces, thereby improving durability (see FIG. 7).

According to another embodiment, the first and second electrode tabs 111 and 121 and the coupling parts 141 and 151, which correspond to each other may have curved side surfaces that are gradually recessed from both ends toward the centers thereof to improve durability through the curved side surfaces.

According to further another embodiment, the first and second electrode tabs 111 and 121 and the coupling parts 141 and 151, which correspond to each other may have protruding side surfaces that gradually protrude from both ends toward the centers thereof, and thus the electrode tabs 111 and 121 and the electrode leads increase in area to improve durability.

Hereinafter, in description of the electrode assembly according to further another embodiment of the present invention, components having the same constitution and function as those according to the foregoing embodiments have been given by the same reference numeral, and thus duplicated description will be omitted.

[Battery Cell According to the Present Invention]

Figure 8:
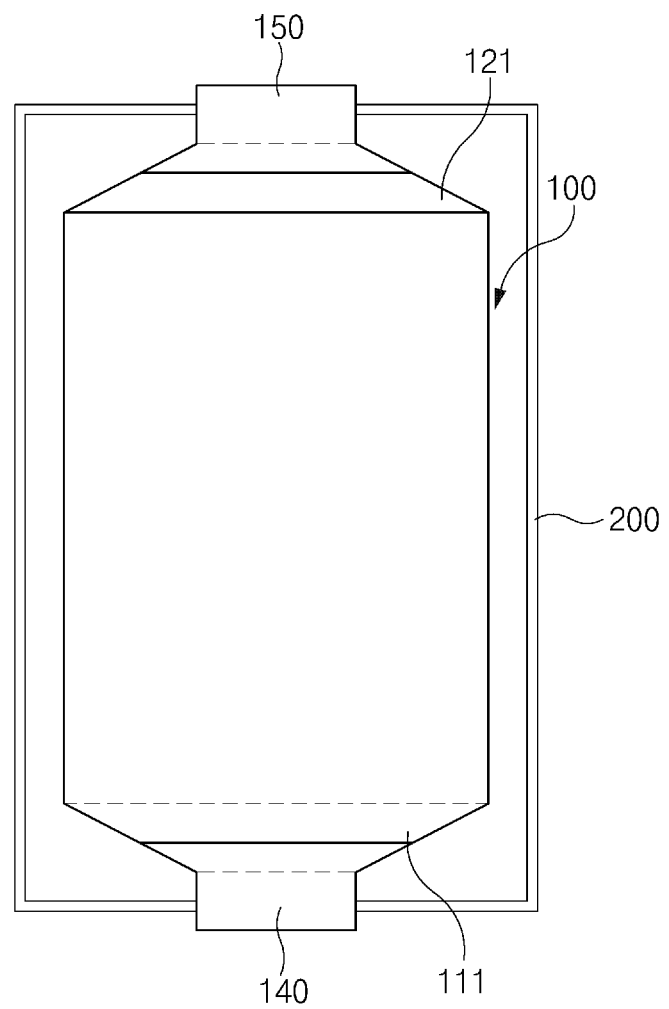
FIG. 8 is a view of a battery cell including the electrode assembly.

As illustrated in FIG. 8, a battery cell according to the present invention may include an electrode assembly 100 and a pouch 200 for accommodating the electrode assembly 100.

The electrode assembly 100 may include a unit cell A in which a first electrode 110, a second electrode 120, and a separator 130 disposed between the first and second electrodes 110 and 120 are stacked on each other or a structure in which the unit cells A are repeatedly stacked with the separator 130 therebetween Also, a first electrode tab 111 protrudes from the first electrode 110, and a second electrode tab 121 protrudes from the second electrode 120.

Here, the first and second electrode tabs 111 and 121 may protrude from the electrode assembly 100 in both directions, particularly, may symmetrically protrude outward from both vertexes of the electrodes 110 and 120.

Since the electrode assembly 100 is described in detail in the foregoing embodiments, the detailed descriptions of the electrode assembly 100 will be omitted.

The electrode assembly 100 may be built in the pouch 200 in a state where the first and second electrode leads 140 and 150 protrude from the electrode tabs 111 and 121 in both directions.

Thus, the battery cell according to the present invention may include the electrode assembly 100 having the trapezoidal electrode tabs to prevent the first and second electrode tabs 111 and 121 from being damaged or broken even though an external impact is applied to the pouch 200. That is, the battery cell having excellent durability may be manufactured.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. An electrode assembly having a unit cell (A) in which a first electrode, a second electrode, and a separator disposed between the first and second electrodes are stacked on each other or a structure in which the unit cells (A) are repeatedly stacked with the separator therebetween, wherein a first electrode tab protrudes from the first electrode, and a second electrode tab protrudes from the second electrode, the electrodes tabs have widths that gradually decrease in directions in which the electrodes tabs protrude outward from the electrodes, respectively, the widths of the electrode tabs adjacent to the electrodes are the same as the widths of the electrodes, and the first and second electrode tabs have curved side surfaces that are gradually recessed from both ends toward the centers thereof.

2. The electrode assembly of claim 1, wherein the first and second electrode tabs respectively protrude from both sides of the electrode assembly, and the first and second electrode tabs respectively protrude from both vertexes of the electrodes.

3. The electrode assembly of claim 1, further comprising first and second electrode leads respectively coupled to the first and second electrode tabs.

4. The electrode assembly of claim 3, wherein coupling parts of the first and second electrode leads respectively coupled to the first and second electrode tabs correspond to the first and second electrode tabs.

5. The electrode assembly of claim 4, wherein the first and second electrode tabs and the coupling parts, which correspond to each other have linear side surfaces.

6. The electrode assembly of claim 4, wherein the first and second electrode tabs and the coupling parts, which correspond to each other have curved side surfaces that are gradually recessed from both ends toward the centers thereof.

7. The electrode assembly of claim 4, wherein the first and second electrode tabs and the coupling parts, which correspond to each other have protruding side surfaces that gradually protrude from both ends toward the centers thereof.

8. A battery cell comprising:
an electrode assembly manufactured by claim 1; and
a pouch for accommodating the electrode assembly.

9. An electrode assembly having a unit cell (A) in which a first electrode, a second electrode, and a separator disposed between the first and second electrodes are stacked on each other or a structure in which the unit cells (A) are repeatedly stacked with the separator therebetween,
wherein a first electrode tab protrudes from the first electrode, and a second electrode tab protrudes from the second electrode,
the electrodes tabs have widths that gradually decrease in directions in which the electrodes tabs protrude outward from the electrodes, respectively,
the widths of the electrode tabs adjacent to the electrodes are the same as the widths of the electrodes, and
the first and second electrode tabs have side surfaces of which respective central portions that are curved so as to convexly protrude to form protruding portions that gradually protrude from both ends toward the centers thereof.

10. An electrode assembly comprising:
a unit cell (A) in which a first electrode, a second electrode, and a separator disposed between the first and second electrodes are stacked on each other or a structure in which the unit cells (A) are repeatedly stacked with the separator therebetween;
a first electrode tab protruding from the first electrode;
a second electrode tab protruding from the second electrode tab;
a first electrode lead having a coupling part coupled to the first electrode tab; and
a second electrode lead having a coupling part coupled to the second electrode tab,
wherein the first and second electrodes tabs have widths that gradually decrease in directions in which the first and second electrodes tabs protrude outward from the first and second electrodes, respectively, and
wherein the coupling parts of the first and second electrode leads overlap the first and second electrode tabs, respectively, such that the coupling parts have widths that gradually decrease in the directions in which the first and second electrodes tabs protrude outward from the first and second electrodes, respectively.

11. The electrode assembly of claim 10, wherein the first and second electrode tabs respectively protrude from both sides of the electrode assembly, and
the first and second electrode tabs respectively protrude from both vertexes of the electrodes.

12. The electrode assembly of claim 10, wherein each of the first and second electrode tabs has a trapezoidal shape.

13. The electrode assembly of claim 10, wherein the trapezoidal first and second electrode tabs have linear side surfaces.

14. The electrode assembly of claim 10, wherein the first and second electrode tabs have curved side surfaces that are gradually recessed from both ends toward the centers thereof.

15. The electrode assembly of claim 10, wherein the first and second electrode tabs have side surfaces of which respective central portions convexly protrude to form protruding portions that gradually protrude from both ends toward the centers thereof.

16. A battery cell comprising:
an electrode assembly of claim 10; and
a pouch for accommodating the electrode assembly.

* * * * *